US006216501B1

(12) United States Patent
Marquardt et al.

(10) Patent No.: US 6,216,501 B1
(45) **Date of Patent: *Apr. 17, 2001**

(54) ELECTRONIC KEY

(75) Inventors: Jakob Marquardt, Rietheim-Weilheim; Karl Mueller, Rottweil-Neufra; Ekkehard Sachs, Spaichingen, all of (DE)

(73) Assignee: Marquardt GmbH, Reitheim-Weilheim (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/894,056

(22) PCT Filed: Feb. 15, 1996

(86) PCT No.: PCT/DE96/00275

§ 371 Date: Aug. 12, 1997

§ 102(e) Date: Aug. 12, 1997

(87) PCT Pub. No.: WO96/25575

PCT Pub. Date: Aug. 22, 1996

(30) Foreign Application Priority Data

Feb. 16, 1995 (DE) .............................................. 195 05 190

(51) Int. Cl.[7] ..................................................... B60R 25/04

(52) U.S. Cl. ............................ 70/252; 70/257; 70/278.2; 70/408; 70/413; 70/456 R; 70/459

(58) Field of Search ................................. 70/408, 456 R, 70/459, 460, 278, 413, 257, 277, 278.2, 278.3, 283, 283.1, 252, 256, 278.1, 279.1; 180/287

(56) References Cited

U.S. PATENT DOCUMENTS

| | | | | |
|---|---|---|---|---|
| 2,537,598 | | 1/1951 | Mason . | |
| 2,596,374 | * | 5/1952 | Crapster | 70/456 R |
| 2,600,749 | * | 6/1952 | Gallagher | 70/456 R |
| 2,630,212 | * | 3/1953 | Mosch | 70/456 R X |
| 3,605,464 | | 9/1971 | Ostrager | 70/456 R |
| 3,765,201 | | 10/1973 | Humphrey | 70/456 R |
| 4,688,036 | * | 8/1987 | Hirano et al. | 70/257 X |
| 4,849,749 | * | 7/1989 | Fukamachi et al. | 70/278 X |
| 4,888,970 | | 12/1989 | Kinzler et al. | 70/456 R |
| 5,003,801 | * | 4/1991 | Stinar et al. | 70/408 X |
| 5,117,097 | * | 5/1992 | Kimura et al. | 70/278 X |
| 5,210,525 | * | 5/1993 | Lennon et al. | 70/456 R X |
| 5,311,257 | * | 5/1994 | Spahn | 70/460 X |
| 5,460,022 | * | 10/1995 | Parsons | 70/459 X |
| 5,541,571 | * | 7/1996 | Ochs et al. | 70/257 X |
| 5,632,168 | * | 5/1997 | Yano | 70/408 X |
| 5,878,611 | * | 3/1999 | Lerchner et al. | 70/408 X |

FOREIGN PATENT DOCUMENTS

| | | | | |
|---|---|---|---|---|
| 482277 | * | 4/1952 | (CA) | 70/456 R |
| 1196537 | * | 7/1965 | (DE) | 70/460 |
| 2138991 | | 2/1973 | (DE) . | |
| 2740910 | * | 3/1979 | (DE) | 70/456 R |
| 3314072 | | 10/1984 | (DE) . | |
| G8713501.9 | | 1/1988 | (DE) . | |
| 3738565 | | 5/1988 | (DE) . | |

(List continued on next page.)

*Primary Examiner*—Lloyd A. Gall
(74) *Attorney, Agent, or Firm*—Venable; Robert Kinberg; Catherine M. Voorhees

(57) ABSTRACT

An electronic key for actuating a lock, in particular for use in locking systems in automobiles, is described. The housing of the electronic key has the shape of a thin wedge, the narrow end of the wedge being designed for insertion into the lock. The parts active for the actuation of the lock are also accommodated here. Moreover, the housing has a receptacle for a key bit for a mechanical lock.

20 Claims, 6 Drawing Sheets

FOREIGN PATENT DOCUMENTS

| | | | | |
|---|---|---|---|---|
| 3842790 | | 4/1990 | (DE) . | |
| 9306264 | | 8/1993 | (DE) . | |
| 4226579 | | 2/1994 | (DE) . | |
| 4238042 | | 5/1994 | (DE) . | |
| 4315892 | | 11/1994 | (DE) . | |
| 4340260 | | 4/1995 | (DE) . | |
| 4409559 | | 6/1995 | (DE) . | |
| 0278901 | | 8/1988 | (EP) . | |
| 05278901 | | 8/1988 | (EP) . | |
| 339102 | * | 11/1989 | (EP) | 70/278.2 |
| 1193537 | | 11/1959 | (FR) . | |
| 2354728 | * | 2/1978 | (FR) | 70/DIG. 49 |
| 2541346 | | 8/1984 | (FR) . | |
| 2597537 | * | 10/1987 | (FR) | 70/257 |
| 2158870 | * | 11/1980 | (GB) | 70/278.2 |
| 2020779 | * | 1/1990 | (JP) | 70/278.2 |
| 229372 | * | 9/1990 | (JP) | 70/278.2 |
| WO91/14065 | | 9/1991 | (WO) . | |

* cited by examiner

ELECTRONIC KEY

BACKGROUND OF THE INVENTION

The invention relates to an electronic key for the actuation of a lock, having a housing on which a key bit for a mechanical lock is arranged and a receptacle for the key bit.

In automobiles particularly, the doors are often equipped with central locking, the locks of the doors being capable of being operated remotely by infrared or high-frequency radiation by means of an electronic key for the sake of increased convenience. An automobile door is usually provided with an additional mechanical lock for opening the door, the lock being actuable by means of an additional mechanical key. This ensures that at least one lock for opening a door can be actuated even if the electronic key fails, for example if the energy accumulator is empty.

In the case of electronic keys of this type, then, it is known to fasten the additional key bit;, serving as an emergency key for the mechanical lock, to the housing of the key. So that the additional key bit does not interfere with general operation, it is arranged pivotably on the housing, so that it can be folded into the housing.

Now these known electronic keys may also be provided with extended functions, in that they are used additionally for actuating the ignition lock in the automobile. While the automobile is in operation, the key is secured in the ignition lock against inadvertent removal which would unintentionally cause the automobile to be rendered inoperative. Now it has become clear that there are emergencies in which the known keys fail. If, for example, the voltage supply at the ignition lock breaks down while the automobile is in operation, the electronic key can no longer be removed from the ignition lock. It is consequently also no longer possible to lock the doors of the automobile at the mechanical lock by means of the emergency key.

SUMMARY OF THE INVENTION

The object on which the prior patent application P44 44 913.5 is based is to develop a key further in such a way that the operating reliability of the emergency key is improved.

This object is achieved there in that the emergency key is designed as a separate key, and in that the housing contains a receptacle for the emergency key, into which the latter can be inserted.

The object on which the invention is based is to provide an electronic key which likewise additionally has a mechanical key bit and in which the key housing is designed so as to be easy to operate and visually attractive.

This object is achieved by an electronic key having a housing which contains the parts of the electronic key that effectively actuate a lock where the housing has the shape of a thin wedge with a narrow end designed to fit into the lock and the parts that effectively actuate the lock are contained in the narrow end of the housing.

In the key according to the invention, the position of the active part of the electronic key can be identified immediately by touch when it is picked up. The key is visually highly attractive. It may be designed with a small thickness, particularly if the mechanical key is fitted edgewise in the housing. The key according to the invention has laterally large uninterrupted faces and therefore possesses only a few or no sharp edges, so that it does not constitute a risk of damage to coat pockets, etc. Operating elements of different size and their handling symbols can be presented clearly on these surfaces. To make it easier to locate the individual operating elements in darkness, markings, for example webs, grooves or the like, may be provided on the housing surface between the operating elements. Also, indicator elements and setting elements for storing reference data can be accommodated on the side faces. Further refinements and advantages emerge from the description of exemplary embodiments and the subclaims.

BRIEF DESCRIPTION OF THE DRAWINGS

The various exemplary embodiments of the electronic key according to the invention are explained by means of the drawing in which.

DETAILED DESCRIPTION OF THE INVENTION

Figure 1:
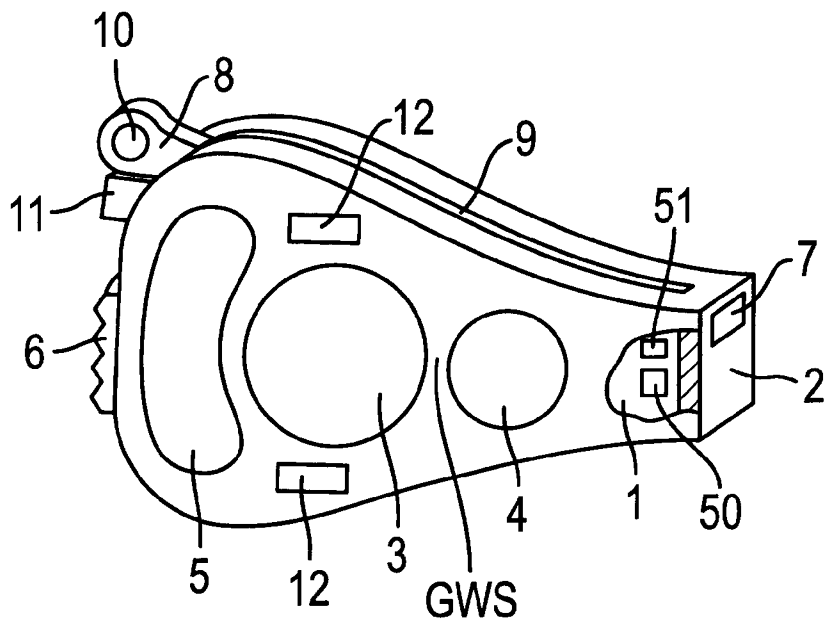
FIG. 1 shows a perspective illustration of a key according tore invention.

In FIG. 1, the housing of the electronic key is indicated with 1. It is of wedge-shaped design. The right. narrow end 2 of the wedge is introduced into a lock to be actuated, for example into the ignition lock of an automobile. The housing thickness, which is small in comparison with the other dimensions and therefore has a pleasing effect when the key is being carried, can be seen.

The housing 1 contains a printed board (not shown). Located on this printed board is an electronic circuit which is designed, for example, as an integrated circuit. This electronic circuit is fed by an energy accumulator, for example a battery or storage cell, and serves for operating the electronic key. A transmitting element 50 and a receiving element 51 are arranged on the front side 2 of the housing 1.

The transmitting element and the receiving element can work by infrared radiation, high-frequency radiation or the like. When, for example, a push button 3 is actuated, a code is generated in the electronic circuit of the key and is transmitted in the manner of a unidirectional communication via the transmitting element. This code is picked up by a corresponding receiver on the automobile and decoded and the user authorization is analyzed. If user authorization is in order, the corresponding function is executed on the central locking system for the door locks.

When the key is in the ignition lock of the automobile, a code is exchanged via the transmitting element and receiving element, for example in the manner of a two-way communication, with corresponding transmitting and receiving elements of the ignition lock. In this case, once again, user authorization is analyzed and, if the key is the correct one, the ignition lock can be actuated, for example turned in the usual way, and the automobile is put into operation.

Two-way communication between the key and the ignition lock and one-way communication between the key and the door locks will be explained in more detail below.

For two-way communication between the key and the ignition lock, a unique identifier for the respective automobile is filed as an individual identifier in the electronic circuit of the key. This individual identifier may be, for example, a unique number issued by the automobile manufacturer. The same individual identifier is likewise stored in the ignition lock. When the key is introduced into the ignition lock, an identification of the individual identifier is carried out.

For this purpose, first a random number, as an identifying number, is determined by means of a random number generator in the ignition lock and is stored in the ignition lock. A code is formed from this identifying number in the electronics of the ignition lock by means of a fixed algorithm and is transmitted, as a second operating signal, from the transmitting element of the ignition lock to the receiving element of the key. This second operating signal picked up by the receiving element of the key is decoded into the identifying number in the electronic circuit of the key by means of the algorithm. This identifying number and the individual identifier stored in the electronic circuit of the key are then used to form a coded first operating signal in the electronic circuit of the key by means of the fixed algorithm. The identifying number is simultaneously stored in the electronic circuit of the key. This first operating signal is subsequently transmitted to the ignition lock by the transmitting element of the key. The first operating signal is thereafter decoded in the electronic circuit of the ignition lock according to the fixed algorithm, thus resulting in a determined identifying number and a determined individual identifier.

A comparison of the determined individual identifying and determined identifying number with the individual identifier and identifying number stored in the ignition lock is subsequently carried out. If this comparison is positive, that is to say if the individual identifier and the identifying number are correct, user authorization is given. As a result, for example, the immobilizer is cancelled and the automobile is put into operation.

For one-way communication between the key and the door locks from a distance of a few meters, a third operating signal is formed by means of a fixed algorithms and transmitted, for example being triggered by actuating the button 3, from the individual identifier stored in the electronic circuit of the key and from the identifying number which was determined in the random number generator of the ignition lock when the automobile was last put into operation and which was likewise stored in the electronic circuit of the key. The third operating signal picked up by the receiver on the automobile is transmitted to electronics, for example those in the ignition lock, and is decoded there by means of the stored identifying number and the fixed algorithm. The decoding result produces a determined individual identifier. The determined individual identifier is compared with the individual identifier stored in the electronics and, if they are identical, unlocking or locking of the central locking system is triggered.

Here, in order to simplify the effort in remotely operating the central locking system, there is only a one-way communication from the key to a corresponding receiver on the automobile. Nevertheless, for this purpose too, it is possible to have a two-way communication which is reliable in terms of theft protection, in a similar way to that which occurs between the key and ignition lock. The key may also be used for opening the garage door or the house door if their locks are designed correspondingly.

Further push buttons 4 and 5 and a sliding switch 6 for triggering further operating functions, for example for triggering an alarm, are also provided in FIG. 1. Grooves, webs, symbols GWS may be arranged between adjacent operating elements, e.g., push button 4 and button 3.

Grooves 53 are provided around push button 4. A web 54 can be provided as well as a symbol 55 on push button 3. Symbol 55 indicates that button 3 unlocks the central locking system. FIG. 1 shows schematic representations of grooves 53, web 54 and symbol 55. If the automobile is equipped correspondingly, a radio alarm signal may also contain the location of the automobile.

The housing 1 also contains a sliding mechanical key which is accommodated in a receptacle 7 on the upper part of the housing 1. The sliding key can be pushed to the right out of the receptacle 7 by means of an actuating lever 8. The housing 1 contains, on top, a slot 9 for the actuating lever 8. The slot 9 may have an elastic lip which normally seals it off, but gives way to the actuating lever when the sliding key is displaced.

The housing contains stops and catches in the two end positions of the key, in order to secure the mechanical key.

The housing 1 is rounded at the left wide end, in order to avoid sharp edges and to make the shape more attractive. The lever 8 contains an orifice 10, in order to suspend the extracted (detached) mechanical key on a key ring. The housing 1 may have a lug, so that the entire key can be suspended or hung up.

Indicator elements 12 are also marked in FIG. 1, for indicating any states of the system (for example, battery charge or location). A movable stop may be removed by means of an actuating knob 11, so that the key can be extracted from the receptacle 7. This is useful particularly when the design of the key includes remote control, because, in this case, the mechanical key, which is also suitable for locking the trunk, can be taken away by the driver, while the workshop or porter keeps the electronic key for the purpose of moving the automobile.

Figure 2:
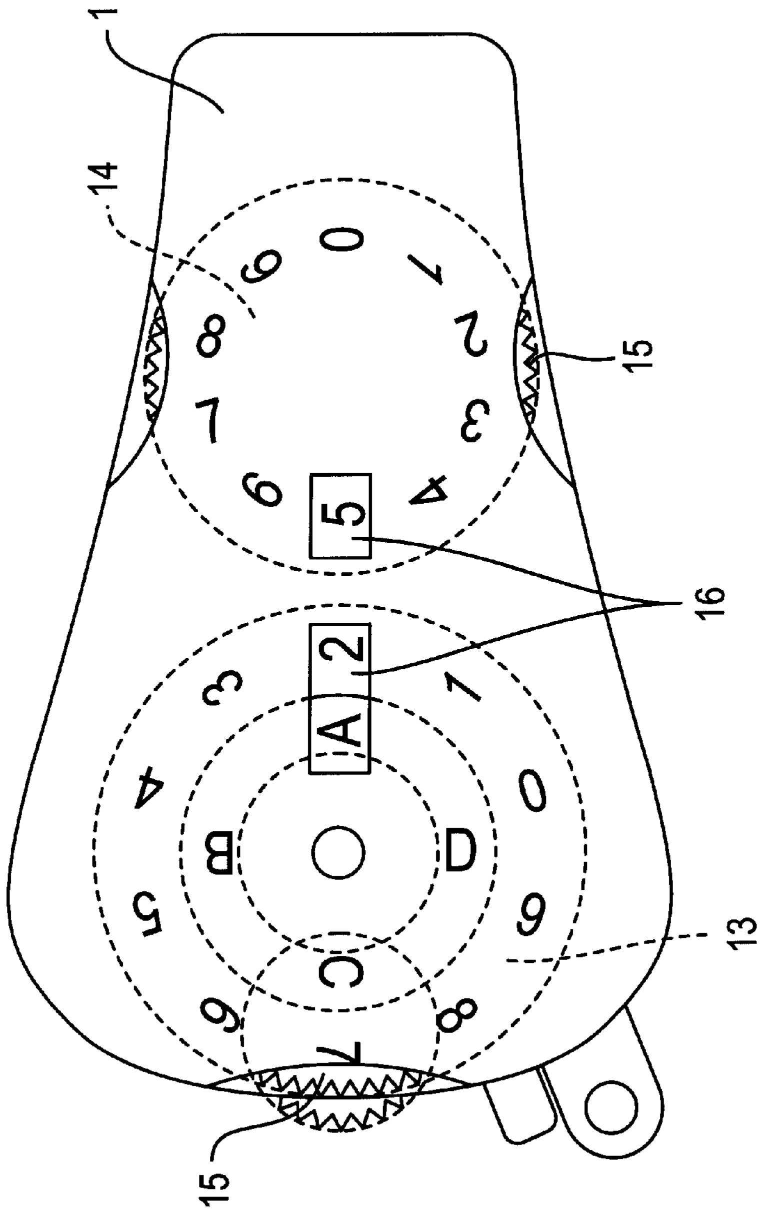
FIG. 2 shows a top view of the rear side of the electronic key.

FIG. 2 shows the rear side of the key housing 1. Here, two rotary disks 13 and 14 provided with symbols (digits, letters) are accommodated under the housing surface. The rotary disks emerge at points 15 and can be rotated by hand there. The set symbols can be seen at windows 16. They may identify, for example, a parking place number or the room number of a hotel. The housing is designed in appropriate colors and is supplied in different colors, for example for ladies and gentlemen.

The housing is preferably of two-part design. In the design having a sliding key, when the electronic key is inserted into the ignition lock the mechanical key is pushed into its initial position, if it is not already located there.

Figure 3:
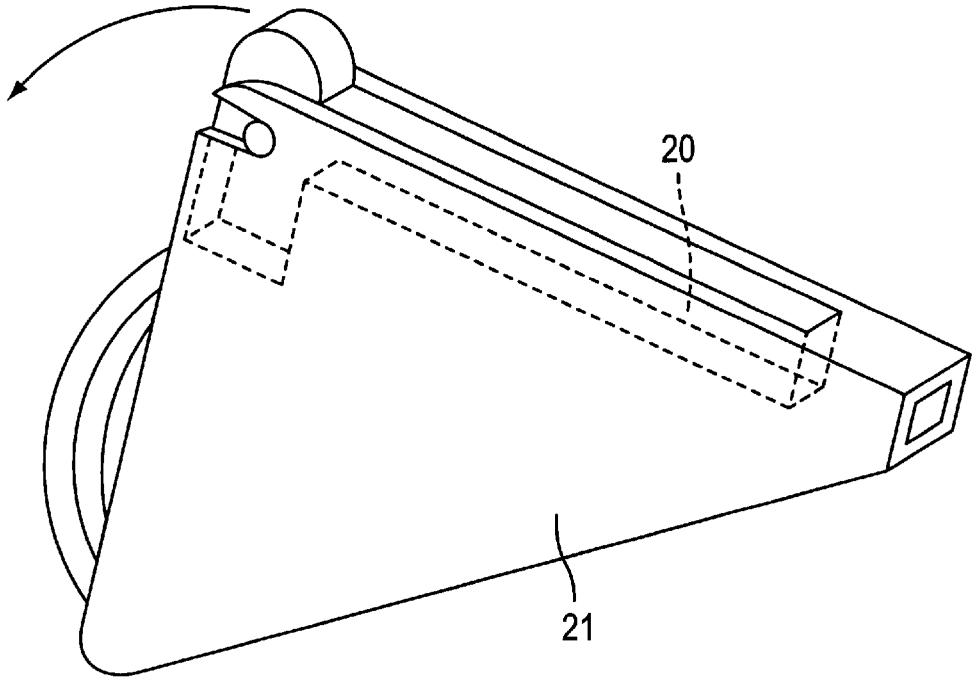
FIG. 3 and FIG. 4 show perspective illustrations of further designs.

FIG. 3 illustrates a wedge-shaped key, in which the mechanical key 20 is connected to the housing 21 so that it is capable of being swung out.

Figure 4:
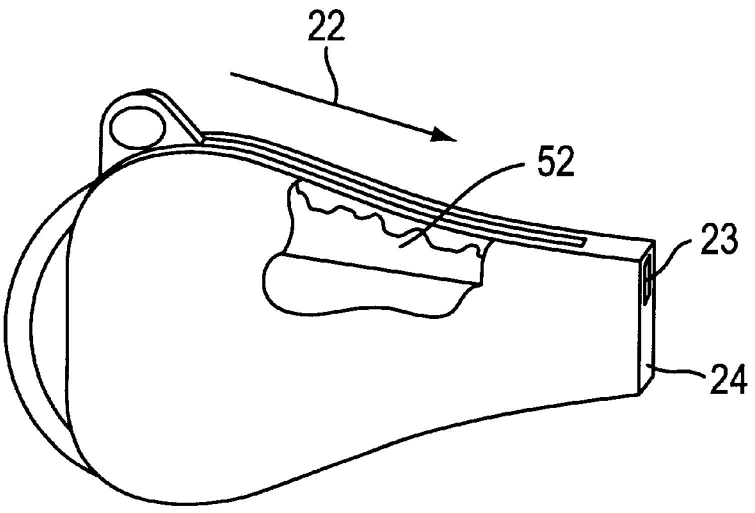

FIG. 4 shows, once again, a wedge-shaped key with a mechanical key which is designed as a sliding key 52. Here, the sliding key 52 is arranged edgewise in the housing, as may be seen from the correspondingly designed receptacle 23. This solution makes it possible for the housing to have a very thin design. It may be employed, in particular, in the case of electronic keys which do not contain any remote control, hence also do not require their own energy source (battery) (when they are used its an ignition key, the energy is transmitted from the lock to the key), and in which there is therefore space available for such an arrangement of the mechanical key on the active narrow side 24.

Figure 5:
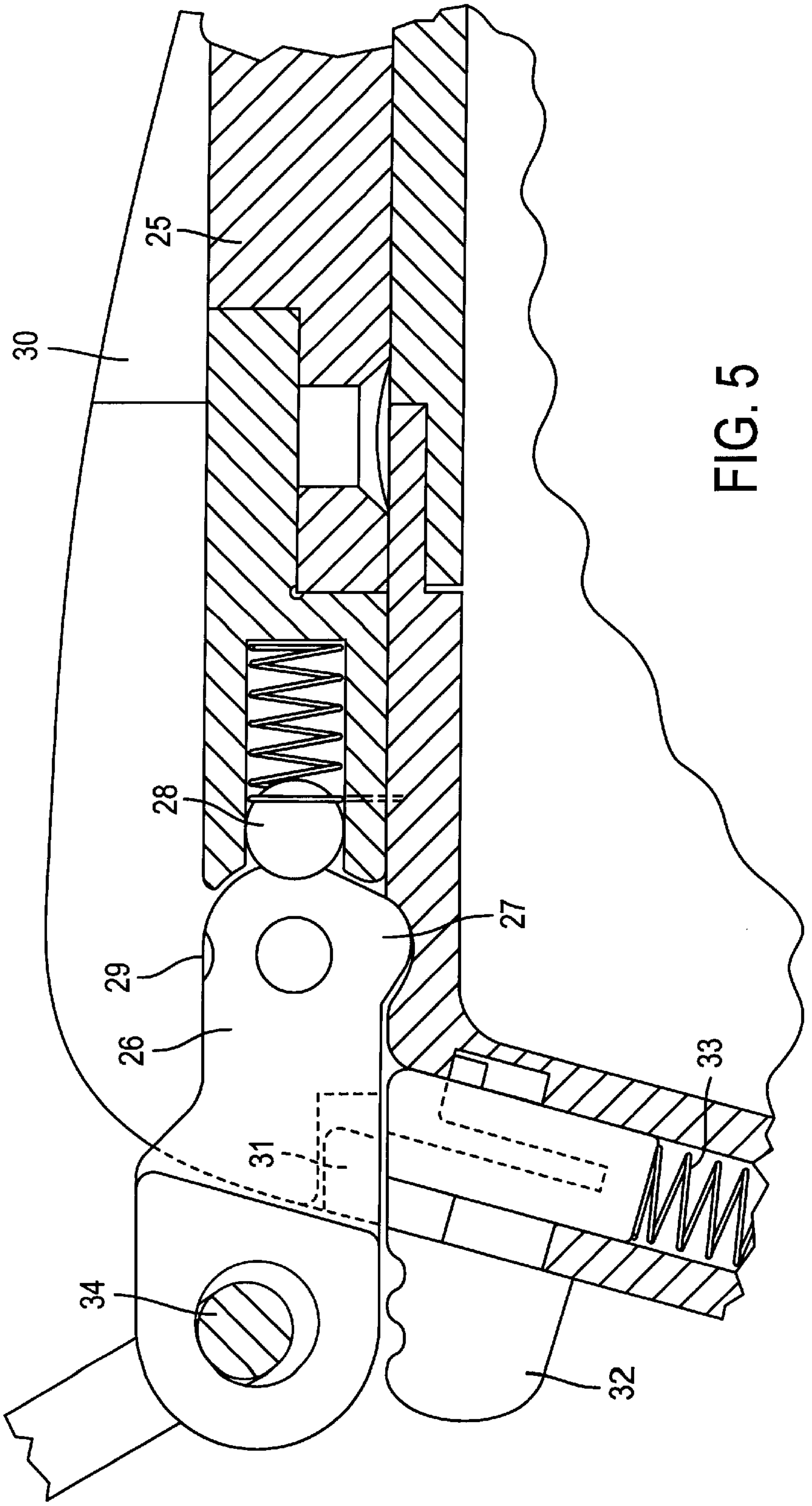
FIG. 5 and FIG. 6 show part illustrations of sections through the housing of the electronic key.

The catch for the mechanical key 25 and the possibility for removing it from the receptacle can be seen from the sectional drawing of FIG. 5 which shows part of a section through the housing 1 of FIG. 1 along the slot 9. In the position shown, the actuating lever 26 is engaged in a depression and consequently the mechanical key 25 is locked. If the key is to be pushed out of its receptacle to the right, the actuating lever 26 is rotated upward, until a spring-mounted ball 28 engages into the depression 29. The mechanical key 25 can then be displaced to the right as far as a stop and a further catch by means of the actuating lever 26. If, on the other hand, the key 25 is to be extracted completely from the housing 30, a stop 31 is drawn downward counter to the force of the spring 33 by means of a knob 32. The mechanical key can then be drawn out to the left. The actuating lever 26 may be manufactured from high-strength plastic. 34 denotes a key ring, to which the electronic key as a whole or else only the mechanical key can be secured.

Figure 6:
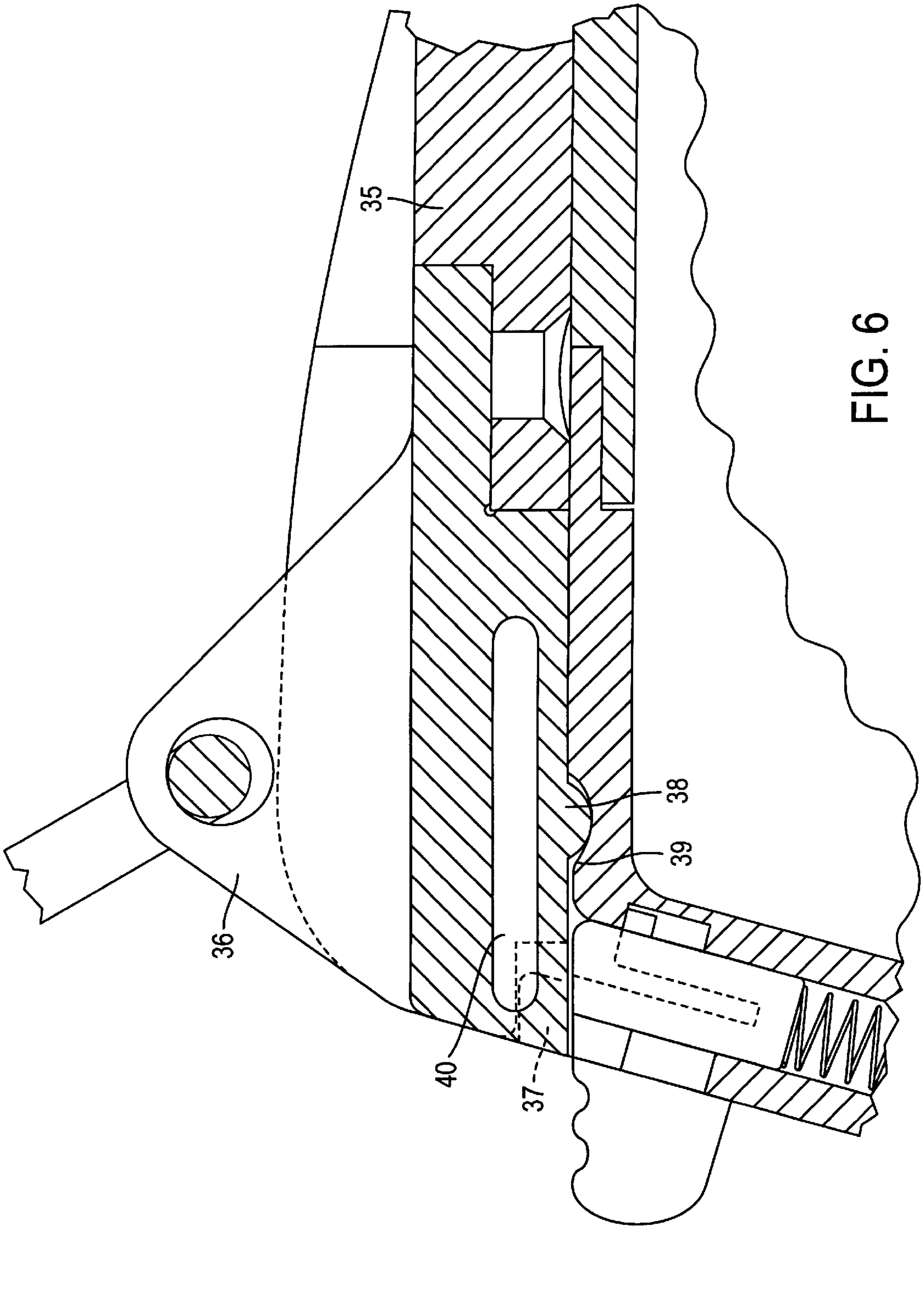

In the exemplary embodiment of FIG. 6, part of the mechanical key 35 together with its actuating lever 36 is shown once again. Here too, a displaceable stop 37 is provided. The catch is formed by a convexity 38 on the actuating lever 36 and by a depression in the housing 39. By means of the cutout 40, the actuating lever 36 manufactured from plastic is resiliently flexible at this point, so that the convexity 38 can be pushed out of the depression.

What is claimed is:

1. An electronic key for actuating an electronic lock used in a locking system in automobiles, said electronic key comprising:

a housing having an upper side surface, a lower side surface and an edge surface extending along the edges of the upper and lower side surfaces and connecting the side surfaces, the side surfaces having a wide end and a narrow end located opposite the wide end; and electronic component means for solely actuating the lock to put the automobile into operation and are located entirely in the housing, wherein the side surfaces extend continuously tapered from the wide end toward the narrow end in such a way that the housing is in the shape of a thin wedge and the wide end defines a handling part for a user, and wherein the narrow end of each side surface and an associated edge surface form an elongated narrow part of the housing which is adapted to be inserted into the electronic lock, and the electronic component means that actuate the electronic lock are contained in the elongated narrow part of the housing.

2. A key according to claim 1, wherein the wide end of each side surface and an associated edge surface form a wide part of the housing and the wide part is rounded along the wide end of the upper and lower side surfaces.

3. A key according to claim 1, wherein the wide end of each side surface and an associated edge form a wide part of the housing and further comprising a lug which is arranged on the wide part.

4. A key according to claim 1, further comprising at least one operating element for triggering operating functions, said operating element being mounted on at least one side surface of the wedge-shaped housing.

5. A key according to claim 4, wherein the at least one operating element is arranged on the wide end of the wedge-shaped housing.

6. A key according to claim 4, wherein at least one of the operating elements serves for remote actuation of the lock.

7. A key according to claim 4, wherein at least one of the operating elements functions to trigger an alarm.

8. A key according to claim 4, further comprising grooves, webs, or symbols which are arranged between adjacent operating elements.

9. A key according to claim 1, further comprising at least one indicator element indicating the state of the electronic key, said at least one indicator element being provided on at least one side surface of the wedge-shaped housing.

10. A key according to claim 1, further comprising at least one adjustment element for storing reference data, said at least one adjustment element being provided on at least one side surface of the wedge-shaped housing.

11. A key according to claim 1, wherein the parts of the electronic key that effectively actuate the lock include a transmitter.

12. A key according to claim 11, wherein the parts of the electronic key that effectively actuate the lock further include a receiver.

13. A key according to claim 1, further comprising a mechanical key having a key bit of a length and a receptacle located in the housing for receiving the entire length of the key bit.

14. A key according to claim 13, wherein the key bit is provided with a grip part and the mechanical key thus formed can be extracted from the receptacle.

15. A key according to claim 13, wherein the key bit is connected to the housing so that it can be swung out of the receptacle.

16. A key according to claim 13, wherein the edge surface of the housing is narrower than the upper and lower side surfaces of the housing, and the key bit can be pushed out of the narrow, edge surface of the wedge-shaped housing.

17. A key according to claim 16, wherein the key bit has a wide side and is accommodated in said receptacle with the wide side being approximately parallel to side surfaces of the wedge-shaped housing.

18. A key according to claim 13, wherein the housing has two ends and stops located in each end for securing the key bit in its end positions.

19. A key according to claim 18, wherein one of the stop is designed as a movable stop.

20. A key according to claim 13, further comprising catch devices which the key bit engages in its end positions.

* * * * *